Sept. 12, 1967
R. P. RHODES
3,341,597
PURIFICATION OF SATURATED ALIPHATIC DIFLUOROAMINO COMPOUNDS
Filed June 22, 1960
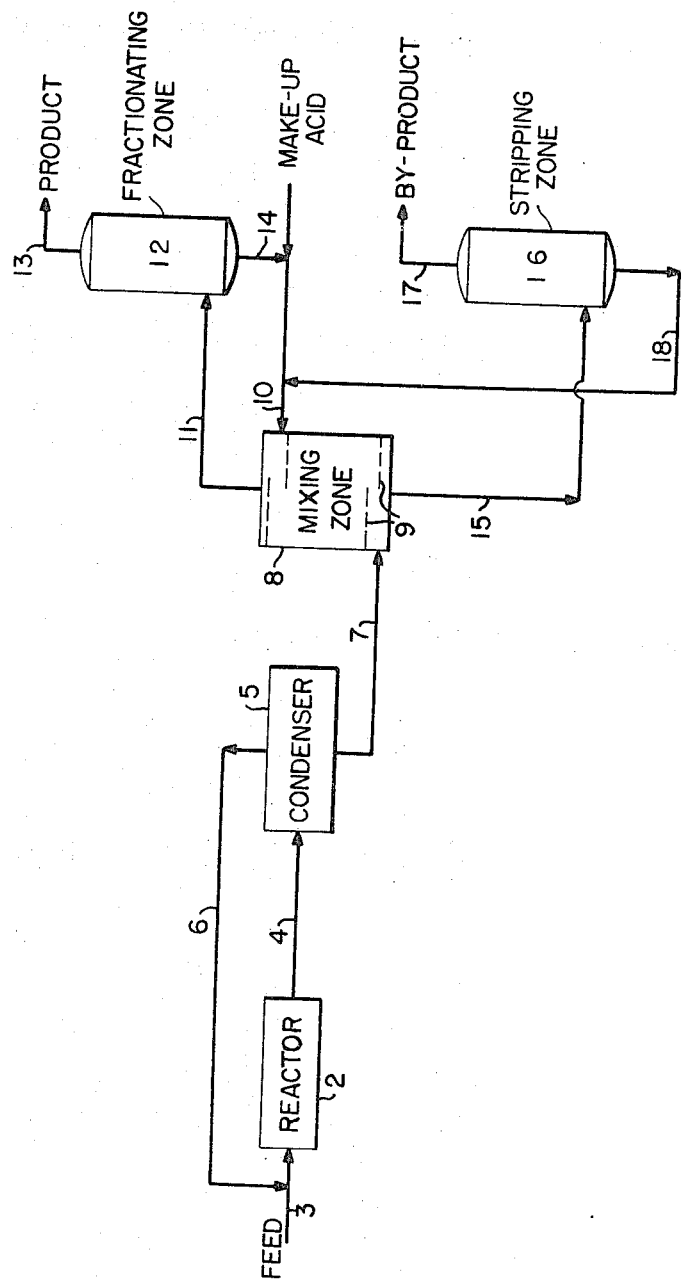
Richard P. Rhodes   Inventor
By R. D. Manahan
Patent Attorney 3,341,597
PURIFICATION OF SATURATED ALIPHATIC DIFLUOROAMINO COMPOUNDS
Richard P. Rhodes, Newark, N.J., assignor to Esso Research and Engineering Company, a corporation of Delaware
Filed June 22, 1960, Ser. No. 38,071
7 Claims. (Cl. 260—583)

The present invention relates to the purification of difluoramino compounds useful as oxidizers in rocket propellants. More specifically, it concerns the removal of olefins and other impurities from organic oxidizers containing a high ratio of difluoramino groups to carbon atoms. Specifically, it relates to the removal of undesirable unsaturated and semipolar substances in saturated or substantially saturated organic difluoramino products by extraction with a strong sulfuric acid solution.

Difluoramino compounds are known to be outstanding oxidizers for rocket propellants. These compounds are generally prepared by reacting an olefin or multi-olefin with tetrafluorohydrazine at elevated temperatures and superatmospheric pressures. The liquid reaction product, which can be separated from the gases in the reactor effluent stream by condensation, usually comprises a mixture of the desired product, unsaturates, halogen compounds (where the olefinic reactant contains chlorine or bromine atoms) and other unidentified impurities. It is difficult to separate the saturated organic difluoramine from the by-products by conventional distillation techniques since a number of the ingredients of the reaction mixture boil in the same range.

One object of the present invention is to provide a liquid phase extraction method for separating saturated organic difluoramino compounds, such as 1,2,3,4-tetra (difluoramino) butane, from by-products, such as 1,4- and 1,2-bis (difluoramino) butenes. Other objects will be apparent from the following description of the invention.

It has been surprisingly discovered that concentrated (preferably about 94 to 100 wt. percent) sulfuric acid can be used to extract the by-products and other impurities from organic difluoramino compounds, especially those that are highly substituted with $NF_2$ groups. While 55 to 70 wt. percent solutions of sulfuric acid have been used heretofore to extract olefin gases, such as isobutylene, from hydrocarbon fractions as described in U.S. Patent 2,581,065, its use to clean up liquid difluoramino compounds was not considered possible or safe because of the instability and reactivity of these compounds. Their chemical properties could be compared to those possessed by amines which are well known to be reactive with acids. Thus, it would be assumed that the difluoramino compounds would either decompose when contacted with the acid, or a violent explosion would take place as occurs when difluoramino compounds are admixed with basic solutions or Lewis acids, such as anhydrous aluminum chloride. Furthermore, it was surprising to discover that the extracted material had a vastly improved impact stability. This improvement is particularly important to processors and handlers of rocket propellants.

In accordance with the present invention, impure difluoramino compounds are purified by extracting them with concentrated sulfuric acid in a suitable vessel, i.e. a vat or a countercurrent flow tower, at approximately room temperature or lower, e.g. 5° C., under atmospheric pressure. Dilute sulfuric acid solutions are substantially ineffective in this process. For instance, a 50 wt. percent solution causes little or no improvement in the product. The concentration of the sulfuric acid feed should be at least 85 wt. percent, and preferably it should contain no more than 5 or 6 wt. percent water because the utilization of highly concentrated acid improves the yield by preventing side reactions. If desired, the reaction mixture can be contacted or mixed with the concentrated sulfuric acid extractant at temperatures above room temperature, i.e. up to about 40° C. A multiple extraction process carried out at about room temperature and substantially atmospheric pressure is quite satisfactory.

The amount of sulfuric acid used to extract the by-products from the difluoramine products will vary with the number of stages or trays and the efficiency of the extraction apparatus. Generally speaking, it is best to use an excess of 94 to 100 wt. percent sulfuric acid to insure complete removal of the by-products, especially the unsaturated or more unsaturated substances, from the oxidizer. The volume ratio of reaction mixture to sulfuric acid feed is usually in the range of 1:0.75 to 2.

The contact time can be as short as 1 minute or as long as 120 minutes, although it should not exceed 1 hour when extraction temperatures above room temperature are employed because the compounds decompose when exposed to the polybasic mineral acid for extended periods of time at elevated temperatures. The extraction time is preferably kept to a minimum, i.e. 5 to 10 minutes, through the use of efficient mixing equipment.

The raffinate phase recovered from the mixing zone usually contains a small amount of sulfuric acid which can be removed by distilling the difluoramine product overhead and returning the sulfuric acid, provided it is sufficiently purged of foreign matter, to the mixing zone. In a countercurrent flow tower the raffinate will be withdrawn from the upper part or top of the tower and the acid absorbent or extract phase will be withdrawn from the bottom of the tower. If the extraction is effected batchwise in a vat with stirring, it is necessary to let the mixture settle into separate layers. The gravity separation is often carried out at room temperature and atmospheric pressure. The raffinate phase can be drawn off from a point above the interface of the two phases. The saturated or less unsaturated oxidizer product recovered, which is essentially free of sulfuric acid, frequently has a purity of 95 wt. percent or more. By employing optimum conditions and a multi-stage extraction, products containing less than 1 wt. percent impurities can be realized. The acid extract phase can be stripped of the by-products and the stripped sulfuric acid recovered can be reused in the process.

The following preferred embodiment of the invention will be described with reference to the accompanying drawing which is a flow diagram of the process:

A gas feed consisting of 1 mole of a mixture of (a) 90 wt. percent 1,4-bis (difluoramino) butene-2 and (b) 10 wt. percent of 1,2-bis (difluoramino) butene-3 and 5 moles of tetrafluorohydrazine are fed into reactor 2, which is at 105° C., via line 3. Reactor 2 is a stainless steel bomb, the contents of which exert a pressure of about 400 p.s.i. After 6 hours the reaction mixture is withdrawn through line 4 and passed through a condenser 5 which is cooled with wet ice and salt to a temperature of −10° C. The gases in the reactor effluent are withdrawn overhead from condenser 5 through line 6 and recycled to reactor 2 via line 3. This recycle gas consists mainly of tetrafluorohydrazine. The liquid in the reactor effluent, which consists of a major proportion of 1,2,3,4-tetrakis (difluoramino) butane and minor amounts of the "bis" reactants, is withdrawn from condenser 5 through line 7 which communicates with mixing zone 8 wherein the liquid reactor effluent intimately contacts the acid extractant which consists of concentrated, e.g., 100%, sulfuric acid. The liquid is introduced into the bottom of the mixing zone 8, which is a countercurrent flow tower having a plurality of trays 9, flows upwardly through the tower and is mixed with the sulfuric acid which is fed into the upper portion of the tower through line 10 on each of the trays or stages. The volume ratio of liquid to sulfuric acid fed into the mixing zone is 1:1. The raffinate or extracted product is withdrawn from mixing zone 8, which is at approximately room temperature, through line 11 which communicates with a stripping or fractionating zone 12 maintained at a temperature equal to or slightly above the boiling point of the "tetrakis" product, e.g. 170° C., when the zone is at atmospheric pressure. Substantially pure "tetrakis" product is recovered overhead through line 13 and the residual sulfuric acid in zone 12 is withdrawn through line 14 and recycled to the mixing zone via line 10. Make-up sulfuric acid may be added through line 10. The sulfuric acid extract is withdrawn from mixing zone 8 through line 15 and transferred to the bottom of stripping zone 16 which is at a sufficiently high temperature to remove essentially all of the by-products and impurities in the sulfuric acid, e.g. 180° to 200° C. or higher. The by-products and other materials are taken overhead from the stripping zone 16 through line 17 and essentially pure sulfuric acid is withdrawn from zone 16 through line 18 and recycled to mixing zone 8 via line 10. If desired, the by-products, may be fractionated in a suitable tower (not shown).

The foregoing process may also be used to separate and purify the NF$_2$-containing reaction products of tetrafluorohydrazine and propylene, an allyl halide and other aliphatic unsaturated compounds. Where the feed is a C$_3$ olefin, the liquid in the reactor effluent consists mainly of allyl difluoramine, 1,2,3-tris (difluoramino) propane and sometimes halogen compounds, e.g. bromine compounds where allyl bromide is the reactant. Since the liquids in the reaction mixture are generally lower boiling than those obtained with the C$_4$ reactants, the temperatures of the fractionating zone 12 and stripping zone 16 will be lower, e.g. 130° C. and 175° C., respectively. The allyl difluoramine in the by-product mixture may be separated by fractionation and recycled to the reactor 2. The conditions employed in the reactor of course will vary according to the particular reactants selected for the process. Normally it is advantageous to use elevated temperatures, e.g. in the range of 100 to 400° C., that are below the decomposition temperature of the products. While the pressure may range from as low as 100 mm. absolute pressure to 30 or more atmospheres, superatmospheric pressures are preferred. Furthermore, while stoichiometric amounts of the reactants may be utilized, it is generally advantageous to use an excess of tetrafluorohydrazine. Any unreacted tetrafluorohydrazine may be separated from the reactor effluent and recycled to the reaction zone. The process is generally applicable to the separation and purification of C$_2$ to C$_6$ difluoramino compounds that have a high ratio of NF$_2$ groups to carobn atoms, i.e. generally greater than 1:2.

Besides the continuous extraction process described, batch processes employing a mixer and settler can be employed with equivalent facility. For example, a liquid reaction mixture having the composition shown in the table was continuously shaken with an equal volume of 98% sulfuric acid in a glass vessel for 5 minutes and then the mixture was allowed to settle at ambient temperature into two liquid phases. The sulfuric acid layer was withdrawn from the vessel and the process was repeated two more times. The contents of the extracted reaction mixture after each treatment are shown in the table:

EXTRACTION OF MIXTURE OF C$_4$ DIFLUORAMINO COMPOUNDS WITH 98 WT. PERCENT H$_2$SO$_4$ AT ROOM TEMPERATURE

| | Composition, Wt. Percent | | | |
|---|---|---|---|---|
| | Initial | After 1st Extraction | After 2d Extraction | After 3d Extraction |
| Cis, 1,4-bis (difluoramino) butene | 28 | 21 | 16 | 11 |
| Trans, 1,4-bis (difluoramino) butene | 5 | 3 | 2 | 1 |
| 1,2-bis (difluoramino) butene | 5 | 2 | 2 | 2 |
| 1,2,3,4-tetrakis (difluoramino) butane | 62 | 74 | 80 | 86 |

The results in the table show that the concentrated sulfuric acid selectively extracted the 1,4- and 1,2-bis (difluoramino) butene compounds from the feed. Other polybasic mineral acids do not behave in the same manner. For instance, when a mixture of C$_4$ difluoramino compounds was extracted at room temperature with 85 wt. percent phosphoric acid (20 volumes of acid per volume of feed) no improvement in the "tetrakis" concentration was observed.

As mentioned above, extraction with concentrated sulfuric acid substantially improves the impact resistance of the difluoramine mixture. For instance, the feed in the table had an impact of 3.5 kg. inch prior to extraction with sulfuric acid and an impact of 7.5 kg. inch following the three extractions. Thus the acid also removes the sensitizing impurities in the mixtures.

When a mixture consisting of about 65 wt. percent 1,2,3-tris (difluoramino) propane and 35 wt. percent allyl difluoramine and bromine compounds was mixed for 5 minutes at room temperature with an equal volume of 98 wt. percent sulfuric acid, the concentration of the "tris compound" increased to about 95 wt. percent. Thus this process is particularly effective for extracting the C$_3$ tris difluoramino compounds.

The difluoramino compounds purified in accordance with the present invention may be used as oxidizers in rocket propellants or as intermediates in the preparation of amines and nitriles. A suitable propellant containing 1,2,3,4-tetrakis (difluoramino) butane is as follows:

| Component: | Wt. percent |
|---|---|
| 1,2,3,4-tetrakis (difluoramino) butane | 33.51 |
| Tetranitromethane | 35.57 |
| Boron | 0.92 |
| Natural rubber binder | 30.00 |

Their explosive nature also makes them highly suitable as detonators.

It is not intended to restrict the invention to the embodiments described above since the invention applies to organic difluoramino compounds in general. It should be limited only by the appended claims in which it is intended to claim all of the novelty inherent in the invention as well as all of the modifications and equivalents coming within the scope and spirit of the invention.

What is claimed is:

1. Process for purifying a saturated aliphatic difluoramino organic compound of 2 to 6 carbon atoms per molecule having an NF$_2$ group attached to each carbon atom to remove therefrom an unsaturated aliphatic difluoramino organic compound as an impurity in a mixture with said saturated compound, which comprises contacting said mixture of difluoramino compounds with sulfuric acid of at least 85 wt. percent sulfuric acid concentration in a mixing zone wherein the sulfuric acid selectively reacts with impurities including the unsaturated compound and extracts said impurities and their decomposition product but leaves said saturated compound unextracted and undecomposed in a liquid raffinate phase, and recovering the thus purified saturated aliphatic difluoramino organic compound in the raffinate phase by separation from the acid and its extract.

2. The process according to claim 1, in which the mixture of the difluoramino compounds is contacted with the sulfuric acid at temperature up to about 40° C. for a period of about 1 to 120 minutes and sufficient for the selective reaction and extraction of the impurities while leaving the saturated difluoramino compound in a liquid raffinate phase.

3. The process according to claim 1, in which sulfuric acid is separated from the extract and recycled to the mixing zone.

4. The process according to claim 1, in which the volume ratio of the mixture of difluoramino compounds to sulfuric acid is about 1:0.75 to 2:1.

5. Process according to claim 1, in which the unsaturated difluoramino compound is of lower molecular weight than the saturated difluoramino compound.

6. Process for separating 1,2,3,4-tetrakis (difluoramino) butane from bis (difluoramino) butenes in a mixture of said compounds, which comprises contacting said mixture with approximately an equal volume of concentrated sulfuric acid under conditions that make said bis (difluoramino) butenes react to form an extract with the sulfuric acid while leaving as a liquid raffinate phase, said tetrakis (difluoramino) butane unchanged and thus freed of the bis (difluoramino) butenes that form said extract, and separating said raffinate phase from sulfuric acid and said extract to recover said tetrakis (difluoramino) butane separated from bis (difluoramino) butenes.

7. Process for improving the impact sensitivity of a saturated $C_2$ to $C_6$ aliphatic difluoramino organic compound having an $NF_2$ group attached to each carbon atom when said compound is in a feed mixture containing lower molecular weight unsaturated difluoramino organic compounds as impurities, which comprises reacting and extracting impurities from said crude mixture by concentrated sulfuric acid at about 5 to 40° C. for a period up to about 1 hour and with a volume proportion of the acid to the crude mixture to form an extract of said impurities with the acid and leave said saturated compound freed of said impurities as a liquid raffinate phase, and separating the saturated compound raffinate phase thus freed of said impurities from the acid and from the extract of said impurities to recover the saturated compound having improved impact sensitivity.

References Cited

UNITED STATES PATENTS 2,349,415  5/1944  Draeger et al. _____ 260—677
2,958,715  11/1960  Sanford et al. _____ 260—677

CHARLES B. PARKER, *Primary Examiner.*

LEON D. ROSDOL, ROGER L. CAMPBELL,
*Examiners.*

J. W. WHISLER, R. RAYMOND, *Assistant Examiners.*